(No Model.) 2 Sheets—Sheet 2.

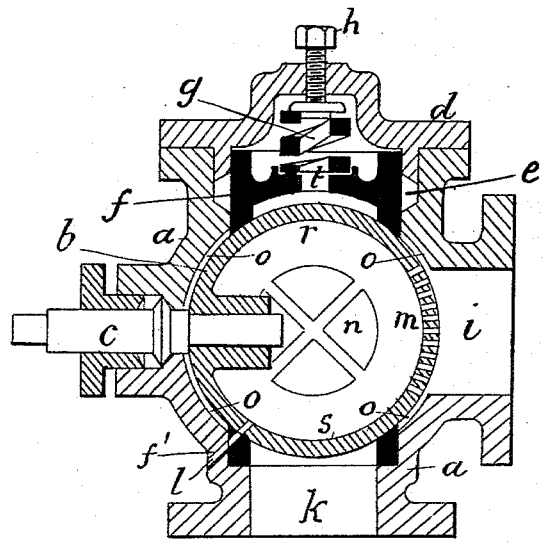

J. CASEY.
VALVE FOR STEAM.

No. 548,518. Patented Oct. 22, 1895.

Witnesses.
Geo. W. Rea.
Robert E. Barrett

Inventor.
James Casey,
By James L. Norris
Atty.

UNITED STATES PATENT OFFICE.

JAMES CASEY, OF LONDON, ENGLAND.

VALVE FOR STEAM.

SPECIFICATION forming part of Letters Patent No. 548,518, dated October 22, 1895.

Application filed April 17, 1895. Serial No. 546,057. (No model.) Patented in England February 5, 1895, No. 2,542.

*To all whom it may concern:*

Be it known that I, JAMES CASEY, consulting engineer, a subject of the Queen of Great Britain, residing at 10 Philpot Lane, London, E. C., England, have invented new and useful Improvements in Valves for Steam, Hydraulic, or other Fluids, (for which I have obtained a patent in Great Britain, No. 2,542, bearing date February 5, 1895,) of which the following is a specification.

My invention relates to valves formed with a globe or ball, bored or otherwise mutilated so as to form passages or openings where required, the valves being fitted in suitable seatings and so arranged that the pressures are balanced or equalized and friction is reduced to a minimum. The valve-box is sometimes made in two parts for convenience in adjusting the ball and its seatings and other fittings, such fittings being suitably adapted to allow for contraction and expansion. Suitable openings are formed in the valve-box, corresponding with those in the ball, so that when the valve is turned to the required position the same may be shut off or turned on. The openings in the valve-box and in the ball, respectively, are arranged to correspond with the full supply of steam, water, or other fluid.

The valve may be operated by hand-wheel, lever, or screw, its radial action and combination of parts being so arranged as to render it very easy in working.

In order that my said invention may be particularly described and ascertained, reference is hereby made to the accompanying drawings, in which similar letters of reference indicate corresponding parts.

Figure 7:
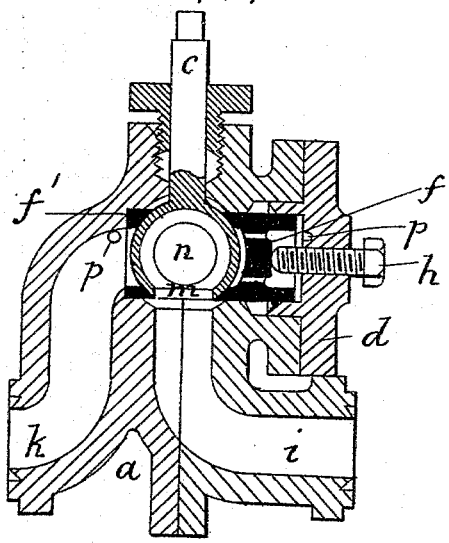
Figure 8:
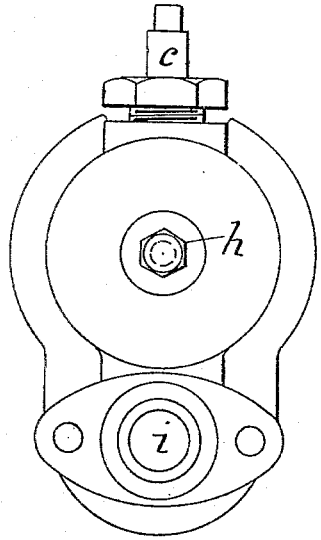
Figure 9:
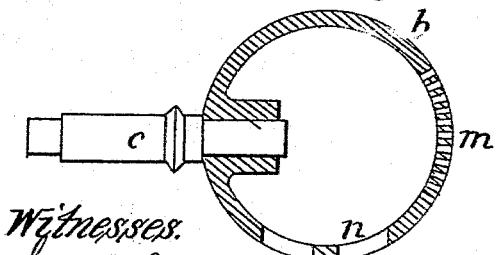
Figure 10:
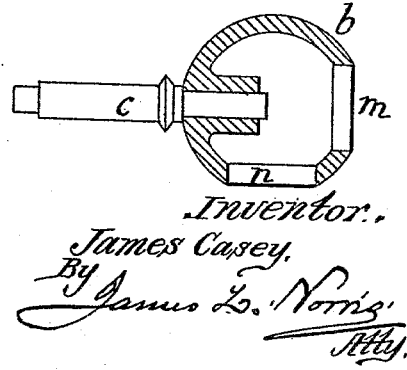

Figures 1 to 6 are respectively sectional elevations and end views showing forms of my invention suitable for steam-valves. Figs. 7 and 8 illustrate one form of my invention suitable for hydraulic valves. Figs. 9 and 10 are detail sections of the ball.

Referring to Figs. 1 and 2, $a\ a$ is the valve-box, the internal space being made rather larger than the inclosed ball-valve $b$. The ball-valve $b$ is preferably made hollow. $c$ is a spindle attached to the ball for turning it upon its center. $d$ is a cover fixed to the valve-box by bolts in the usual manner, and forming, with the upper part of the valve-box, a gland and stuffing-box $e$. $f$ is an annular ring of metal, which is held down upon the ball by means of a spring $g$, the pressure of the spring being regulated by the screw $h$. $f'$ is a metallic or other ring forming a seat to the ball-valve. $i$ is the inlet-passage for the steam, and $k$ is the outlet-passage leading to the engine or other apparatus. $l$ is a small passage for draining any water arising from condensation of the steam in the pipe or valve when the valve is used as a terminal valve and the steam is shut off from $k$, as shown. When the valve is open this passage is closed by the wall of the ball. The opening in the ball shown at $m$ is always open to the passage $i$. The opening $n$ in the ball, when turned by the spindle $c$ so as to coincide with the passage $k$, passes the steam to the engine or other apparatus. The pressure on the ball is equalized by the entrance of the steam to the several spaces $o\ o$ between the ball and the case, the ball being in equilibrium whether the passage $k$ is shut or open. Further, to insure this result, a passage $p$ is formed in the case to equalize the pressures above and below the ball in the event of back-pressure from the engine. An external pipe may be substituted for the passage $p$. The valve is opened and closed by means of the spindle $c$, with a hand-wheel, lever, or other ordinary appliance attached thereto.

The casing shown in Figs. 1 and 2 is in two parts, which are secured together by bolts passing through the flanges $a'\ a'$ after the insertion of the ball and other fittings.

Referring to Figs. 3 and 4, the casing $a$ is shown formed in one casting, the upper part being bored so as to permit of the insertion of the ball. In this arrangement the packing of the gland may be made sufficiently elastic to keep the rings $f$ and $f'$ in steam-tight contact with the ball, the packing being suitably compressed by screwing down the cover $d$ and gland $f^2$.

Figure 5:
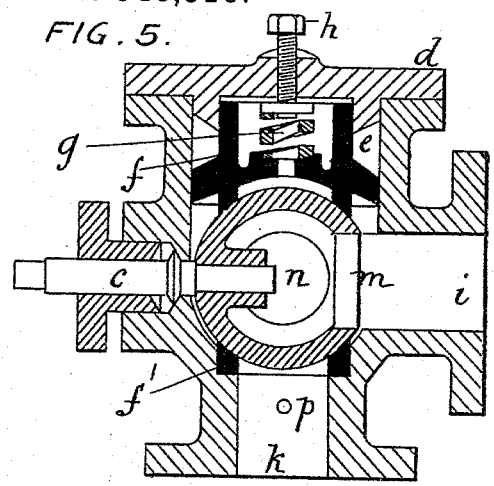
Figure 6:
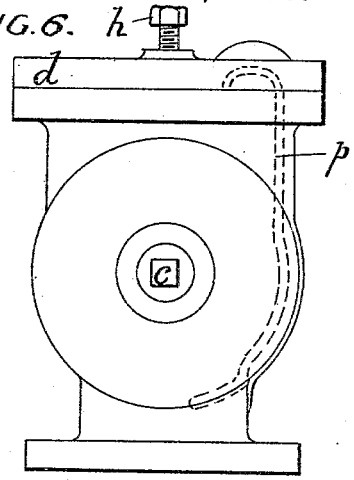

In the modification shown in Figs. 5 and 6 the cover $d$ is bolted down upon the lower flange and a spring $g$ is inserted, as in Fig. 1, to keep the ring $f$ down upon the ball. The opening $m$ in the ball may be perforated with a number of small holes to separate water carried over by the steam when priming occurs, as shown in Fig. 1 and also in separate section in Fig. 9. In other cases a clear opening may be made, as shown in Figs. 3 and 5 and also in separate sections in Fig. 10. The valve being at all times open to the full pressure of the steam in the boiler, the steam gains access to the spaces $o\,o$, Fig. 1, whereby the pressures on the inner and outer surfaces of the globe in contiguity with the spaces $o\,o$ are equalized. In order to equalize the pressures on the segments $r$ and $s$, a passage $t$ is formed in the ring $f$. The space above the ring $f$ is in communication with the passage $k$ by means of a passage $p$, formed in the casting, or an external pipe may be fitted for the same purpose.

My improved valve may be used for the combined purposes of a steam and throttle valve in one.

Referring to Figs. 7 and 8, one modification of my invention, as applied to hydraulic valves, is shown. The packing-rings $f$ and $f'$ are kept in contact with the ball by the gum-metal, or other non-corrosive regulating-screw $h$. $i$ is the inlet-passage, and $k$ is the outlet-passage.

It is obvious that my improved valves are applicable for controlling the passage of other fluids besides steam.

I claim—

1. In a valve, the combination with a box or casing having an inlet and outlet port, of a hollow ball seated within said box or casing and provided with openings, a fluid equalizing space or chamber surrounding said ball, and means for operating the latter whereby the openings therein may be made to register with the ports in the box or casing, substantially as described.

2. In a valve, the combination with a box or casing having internal circular seats, and an inlet and outlet port, of a hollow ball located within said casing and provided with openings, a fluid equalizing space or chamber surrounding said ball, a pipe leading from the upper portion of said equalizing chamber to the lower part thereof, and means for operating said hollow ball, substantially as described.

3. In a valve, the combination with a valve-casing provided with an inlet and outlet port, of a stationary valve-seat located within the casing, an adjustable valve-seat located within the casing above the stationary seat, a spring acting upon said adjustable seat, a hollow ball freely supported between said seats and provided with inlet and outlet openings, and a spindle secured to the hollow ball and extending through the casing whereby said ball may be turned, substantially as described.

4. In a valve the combination with a box or casing provided with an inlet and outlet port, of the valve-seats located within said casing, a spring acting upon one of said seats, a hollow ball freely supported within the casing, a fluid equalizing chamber surrounding said ball, an inlet and outlet opening arranged in said hollow ball, and means for turning the latter, substantially as described.

Dated this 26th day of March, 1895.

JAMES CASEY.

Witnesses:
GEORGE C. DOWNING,
T. F. BARNES.